June 4, 1946.  W. E. W. PETTER ET AL  2,401,624
INFLATABLE GASKET
Filed July 22, 1944
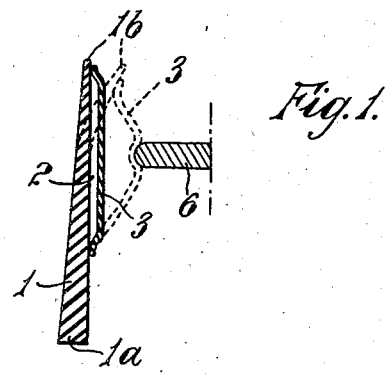
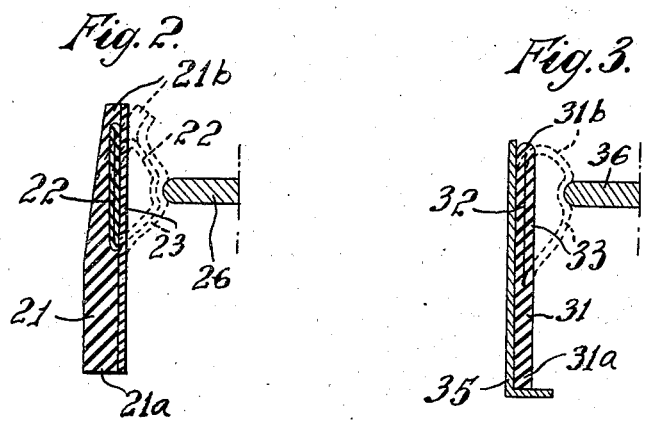
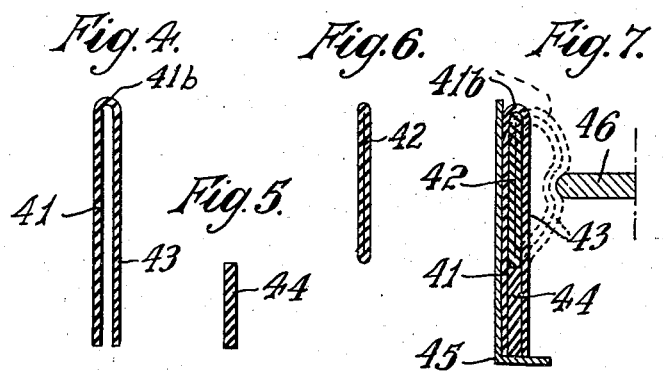
Inventors
William Edward Willoughby Petter
William Macey Widgery
Stanley Thomas Albert Richards
by Benj. T. Rauber, their attorney Patented June 4, 1946

2,401,624

UNITED STATES PATENT OFFICE 2,401,624

INFLATABLE GASKET

William Edward Willoughby Petter, Yeovil, William Macey Widgery, near Yeovil, and Stanley Thomas Albert Richards, Yeovil, England, assignors to Dunlop Rubber Company Limited, London County, England, a British company Application July 22, 1944, Serial No. 546,188
In Great Britain May 31, 1943

5 Claims. (Cl. 20—69)

Our invention relates to improvements in or concerning inflatable gaskets, and particularly relates to gaskets for use in aircraft provided with sealed doors or cabins in its application to which the invention is more particularly described.

In the case of aircraft required to fly at high altitudes where it is desired to maintain a higher pressure in the cabin than that of the surrounding atmosphere, it is necessary to seal such cabin or door thereof with a seal capable of resisting a pressure difference which may vary as the height of the aircraft increases.

The invention has for its object to provide an improved gasket which is inflatable to form a seal with an adjoining surface or structure such as the fuselage of an aircraft and which is quickly releasable therefrom to break such seal by deflation of the gasket to permit the cabin or its door to be opened quickly in case of emergency.

According to this invention we provide an inflatable gasket comprising a strip of flexible jointing material and an inflatable tube, the said tube when deflated and the said strip lying substantially in the same plane.

In order that the invention may be more clearly understood and readily carried into practical effect reference is made, in further describing the same, to the accompanying drawing in which—

Fig. 1 is a sectional view of one form of gasket constructed in accordance with the invention and shown in operative association with part of an aircraft or other structure.

Fig. 2 is a sectional view of a second form of gasket constructed in accordance with the invention in similar operative association to that shown in Fig. 1.

Fig. 3 is a sectional view of a third form of gasket constructed in accordance with the invention and in similar operative association to that shown in Figs. 1 and 2.

Figs. 4 to 6 are sectional views of component gasket parts prior to their assembly into a gasket in accordance with the invention.

Fig. 7 is a sectional view of a fourth combination of gasket assembled from the parts shown in Figs. 4 to 6 and in operative association similar to that shown in Figs. 1 to 3.

Referring to the drawing the improved gasket comprises a strip 1 of flexible jointing material such as rubber and an inflatable tube 2 of similar material and of narrower width than the strip 1, said tube when deflated lying substantially in the same plane as the strip 1.

In the construction shown in Fig. 1 the gasket comprises a facing strip 3 of flexible material such as rubber integrally joined to a thicker and less flexible backing strip 1 of similar material. The facing strip 3 is composed of thin readily flexible rubber of uniform thickness and the backing strip 1 of thicker and less flexible rubber or rubber-like resilient material which may for example taper in cross section from a thickness of the order of three-sixteenths of an inch at the edge portion 1a remote from the tube to a thickness of the order of one-sixteenth of an inch at its opposite edge 1b.

In a second construction shown in Fig. 2 the gasket comprises a backing strip 21 of rubber or the like of which the face is recessed to provide a shallow channel located adjacent one edge of the channelled strip and recessed in the face of the strip 21 to a depth sufficient to contain a deflated tube of rubber 22. The exposed surface of the flattened tube 22 and the channelled face of the strip 21 are covered by a thin facing strip 23 of flexible material such as rubber adhesively secured or vulcanised to the backing strip. The backing strip 21 is of tapered formation diminishing in thickness from its edge portion 21a as described with reference to Figs. 1 and 2. The channel may for example be of the order of 0.07 inch in depth and 0.97 inch in width and the tube contained within such channel may measure 0.07 inch in thickness when deflated and 0.94 inch in width so as substantially to fill the channel.

In a third construction as shown in Fig. 3 instead of employing a separate backing strip 31, tube 32 and facing strip 33 as shown in Figs. 1 and 2 we employ a single strip of rubber which is folded to inverted U section, the contiguous surfaces so formed being united adjacent their free edges 31a to constitute adjacent the remaining edge 31b a single tube 32 of normally flattened formation. The walls of the tube 32 may be prevented from adhesion to one another by the introduction of French chalk or other material in known manner during manufacture.

In Figs. 4 to 7 is shown a modification of the structure shown in Fig. 3 in which modification the gasket is assembled from component parts comprising a folded strip of rubber 41 Fig. 4, a preformed flattened tube 42 Fig. 6, and a packing piece 44 Fig. 5. These component parts are assembled with the tube 42 in the bight or fold of the strip 41, and the packing piece filling the remaining space between the folds and then the walls of the strip 41 which project beyond the tube are united to the opposite sides of the packing piece 44 by vulcanizing or otherwise whereby is formed the fourth construction of gasket shown in Fig. 7.

In operation the gasket is so spaced from the projection 46 that when deflated to its inoperative position shown in solid lines the surfaces of the gasket and the said projection preferably do not touch and are freely movable relative to one another, the spacing being so adjusted that when inflated to the operative position as shown in dotted lines the flexible wall of the gasket makes sealing contact with the projection 46.

In the constructions shown in Figs. 1 and 2 the resilient backing strip 41 is deflected by the inflation of the tube 42 which causes said strip to curl over towards the projection 46, the resistance to such deformation inherent in the resilient rubber or rubber-like material serving to restore the gasket to the inoperative position when the tube is deflated.

The gaskets, particularly when of the construction shown in Figs. 3 and 7 in which the walls of the tube are of uniform thickness, may be provided with a guard plate 35 or 45, the face of said plate adjacent the tube serving to resist the side thrust exerted by such tube when inflated and the edge of the plate to protect the tube from accidental damage when deflated.

Means may be provided for inflating the gasket tube said means preferably comprising an engine-driven blower having in its delivery pipe connected to the gasket a restriction whereby an increased pressure, of which the degree may be predetermined or controlled, is obtained between the restriction and the blower, such pressure being utilised to maintain the gasket tube at an intensity slightly higher for sealing purposes than the pressure within the cabin. Means may also be provided for deflating the gasket tube in the form of an outlet valve connected to the tube of the gasket said valve being opened either by a hand lever or by a coupling to the operating handle controlling the opening of the cabin or its door.

Having described our invention, what we claim is:

1. An inflatable gasket comprising a supporting strip of flexible material having a free edge and a flat inflatable tube on one face of said strip near said free edge and anchored at both its edges to said strip, the wall of said tube being relatively more flexible than said strip whereby said free end of said strip bends toward said tube when said tube is inflated and draws said tube to a flat position against said strip when said tube is deflated.

2. The gasket of claim 1 in which said tube is mounted in a recess in said strip and lies entirely within the plane of the recessed face of said strip.

3. The gasket of claim 1 in which said tube is formed of a flat thin strip of flexible material sealed at one edge to said flexible strip near the free edge thereof and sealed at its opposite edge to the face of said flexible strip.

4. The gasket of claim 1 in which said strip is of rubber composition.

5. A closure which comprises a supporting strip of flexible material having a free edge, a projection having an edge spaced from a side of said strip, a flat inflatable tube mounted flat against and integrally secured at both its edges to said strip on the side thereof facing said projection wheerby said strip will be bent toward said projection when said inflatable tube is inflated to seal against said projection and will draw said tube away from said projection to lie flat against said strip when said tube is deflated.

WILLIAM EDWARD
    WILLOUGHBY PETTER.
WILLIAM MACEY WIDGERY.
STANLEY THOMAS
    ALBERT RICHARDS.